US012608398B2

(12) United States Patent
Shioda et al.

(10) Patent No.: US 12,608,398 B2
(45) Date of Patent: Apr. 21, 2026

(54) VISUALIZATION DEVICE, VISUALIZATION METHOD AND VISUALIZATION PROGRAM

(71) Applicant: NTT, Inc., Tokyo (JP)

(72) Inventors: Tetsuya Shioda, Musashino (JP);
Machiko Toyoda, Musashino (JP);
Kazuki Adachi, Musashino (JP);
Masakuni Ishii, Musashino (JP)

(73) Assignee: NTT, Inc., Tokyo (JP)

( * ) Notice: Subject to any disclaimer, the term of this patent is extended or adjusted under 35 U.S.C. 154(b) by 574 days.

(21) Appl. No.: 18/020,635

(22) PCT Filed: Aug. 19, 2020

(86) PCT No.: PCT/JP2020/031277
§ 371 (c)(1),
(2) Date: Aug. 25, 2023

(87) PCT Pub. No.: WO2022/038713
PCT Pub. Date: Feb. 24, 2022

(65) Prior Publication Data
US 2025/0342172 A1    Nov. 6, 2025

(51) Int. Cl.
*G06F 16/00* (2019.01)
*G06F 16/25* (2019.01)
*G06F 16/26* (2019.01)

(52) U.S. Cl.
CPC ............ *G06F 16/26* (2019.01); *G06F 16/254* (2019.01)

(58) Field of Classification Search
CPC ................................ G06F 16/00; G06F 16/26
See application file for complete search history.

(56) References Cited

U.S. PATENT DOCUMENTS 11,941,020 B2 * 3/2024 Mitelman ................ G06N 3/09
2023/0222712 A1 * 7/2023 Modi ...................... G06T 13/80
345/440

OTHER PUBLICATIONS

Wongsuphasawat et al., "Voyager 2: Augmenting Visual Analysis with Partial View Specifications", Available Online at: https://idl.cs.washington.edu/papers/voyager2, Retrieval Date: Jul. 8, 2020, 12 pages.

* cited by examiner

*Primary Examiner* — Cheryl Lewis
(74) *Attorney, Agent, or Firm* — XSENSUS LLP

(57) ABSTRACT

In accordance with a score representing a relationship between features of input data, an analysis unit analyzes the importance of each feature. An extraction unit extracts a combination of features in which the score satisfies a predetermined condition. A specification unit specifies a visualization system for the combination in accordance with at least the types and connection relationships of the features constituting the extracted combination. A drawing unit draws the relationship between the features constituting the combination in order of priority according to the importance, based on the combination of the features and the visualization system corresponding to the combination.

10 Claims, 10 Drawing Sheets

VISUALIZATION DEVICE, VISUALIZATION METHOD AND VISUALIZATION PROGRAM

CROSS-REFERENCE TO RELATED APPLICATION

The present application is based on PCT filing PCT/JP2020/031277, filed Aug. 19, 2020, the entire contents of which are incorporated herein by reference.

TECHNICAL FIELD

The present invention relates to a visualization device, a visualization method, and a visualization program.

BACKGROUND ART

Traditionally, building high-quality machine learning models requires preprocessing of data and selection of suitable algorithms for learning. Understanding the data essential for this purpose requires data analysis, a trial-and-error process of statistical processing and visualization. Therefore, a technique for visualizing the feature of data and supporting the understanding of data has been known (see NPL 1).

CITATION LIST

Non Patent Literature

NPL 1: KanitWongsuphasawat, and 8 others, "Voyager2: AugmentingVisualAnalysiswithPartialViewSpecifications," [online], 2017, [searched on Jul. 8, 2020], Internet <URL: https://idl.cs.washington.edu/papers/voyager2>

SUMMARY OF INVENTION

Technical Problem

However, in the prior art, it is sometimes difficult to visualize the useful feature of data. For example, the prior art cannot visualize the feature of interest unless the user proactively selects said feature. Therefore, if the user does not have domain knowledge or knowledge of data analysis, such as the point of view on the data to be analyzed or the like, it is difficult to visualize the useful feature.

The present invention was contrived to solve the problems described above, and an object thereof is to enable easy visualization of useful features of data.

Solution to Problem

In order to solve the problems and achieve the object, a visualization device according to the present invention includes: an analysis unit that, in accordance with a score representing a relationship between features of input data, analyzes importance of each feature; an extraction unit that extracts a combination of features in which the score satisfies a predetermined condition; a specification unit that specifies a visualization system for the combination in accordance with at least types and connection relationships of features constituting the extracted combination; and a drawing unit that draws a relationship between the features constituting the combination in order of priority according to the importance, based on the combination of features and the visualization system corresponding to the combination.

Advantageous Effects of Invention

According to the present invention, easy visualization of useful features of data is made possible.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

[Configuration of Visualization Device]

Figure 1:
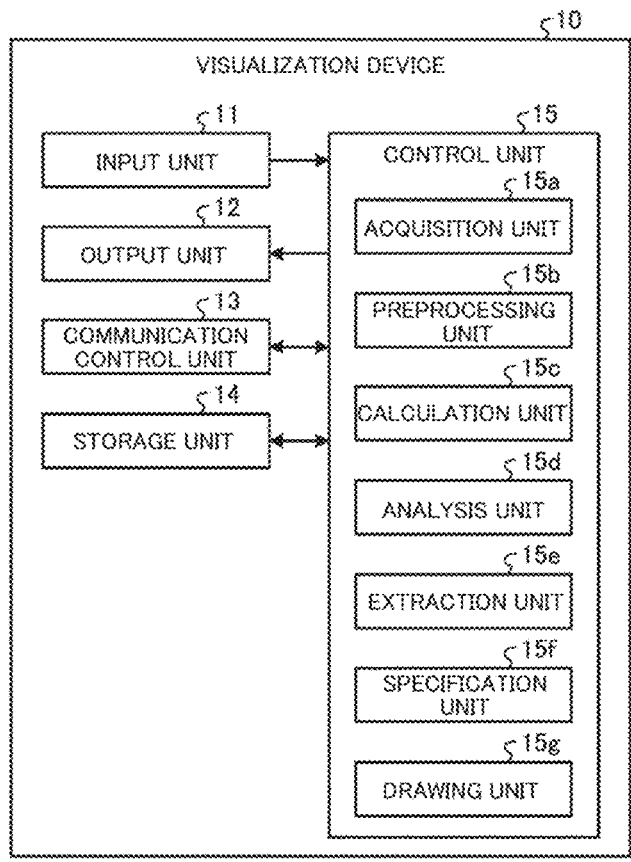
FIG. 1 is a schematic diagram for illustrating a schematic configuration of a visualization device of a present embodiment.

FIG. 1 is a schematic diagram for illustrating a schematic configuration of a visualization device of a present embodiment. As illustrated in FIG. 1, a visualization device 10 according to the present embodiment is implemented by a general computer such as a personal computer, and includes an input unit 11, an output unit 12, a communication control unit 13, a storage unit 14, and a control unit 15.

The input unit 11 is implemented by using an input device such as a keyboard or a mouse, and inputs various pieces of instruction information, such as start of processing, to the control unit 15 in response to an input operation by an operator. The output unit 12 is implemented by a display device such as a liquid crystal display or a printing device such as a printer. For example, a result of visualization processing described hereinafter is displayed on the output unit 12.

The communication control unit 13 is implemented by, for example, a NIC (Network Interface Card), and controls communication between the control unit 15 and an external device via a telecommunication line such as a LAN (Local Area Network) or the Internet. For example, the communication control unit 13 controls communication between the control unit 15 and a management device or the like that manages data subject to the visualization processing described hereinafter.

The storage unit 14 is implemented by a semiconductor memory device such as a RAM (Random Access Memory)

or a flash memory (Flash Memory), or a storage device such as a hard disk or an optical disc. The storage unit 14 stores in advance, for example, a processing program that operates the visualization device 10 and data to be used during the execution of the processing program, or the storage unit 14 stores the processing program and the data temporarily every time the processing is executed. Note that the storage unit 14 may also be configured to communicate with the control unit 15 via the communication control unit 13.

For example, the storage unit 14 stores data output from each functional unit in the control unit 15 during the execution of visualization processing to be described hereinafter. Further, the storage unit 14 may store in advance data subject to the visualization processing described hereinafter. In this case, an acquisition unit 15a to be described hereinafter acquires data from the management device or the like that manages data to be processed prior to the visualization processing, and stores the data in the storage unit 14.

Returning to the explanation of FIG. 1, the control unit 15 is implemented by using a CPU (Central Processing Unit) or the like, and executes a processing program stored in a memory. Accordingly, as illustrated in FIG. 1, the control unit 15 functions as the acquisition unit 15a, a preprocessing unit 15b, a calculation unit 15c, an analysis unit 15d, an extraction unit 15e, a specification unit 15f, and a drawing unit 15g. Note that each or some of these functional units may be implemented in different hardware. In addition, the control unit 15 may include other functional units.

The acquisition unit 15a acquires data subject to the visualization processing from the data management device or the like via the input unit 11 or the communication control unit 13. The data subject to the visualization processing is data in a table format such as CSV.

The preprocessing unit 15b performs preprocessing of the visualization processing to be described hereinafter, on the acquired data. For example, the preprocessing unit 15b performs automatic estimation of a data type, missing data processing, deletion of unnecessary features, statistical processing, and the like, on the data acquired by the acquisition unit 15a.

Figure 2:
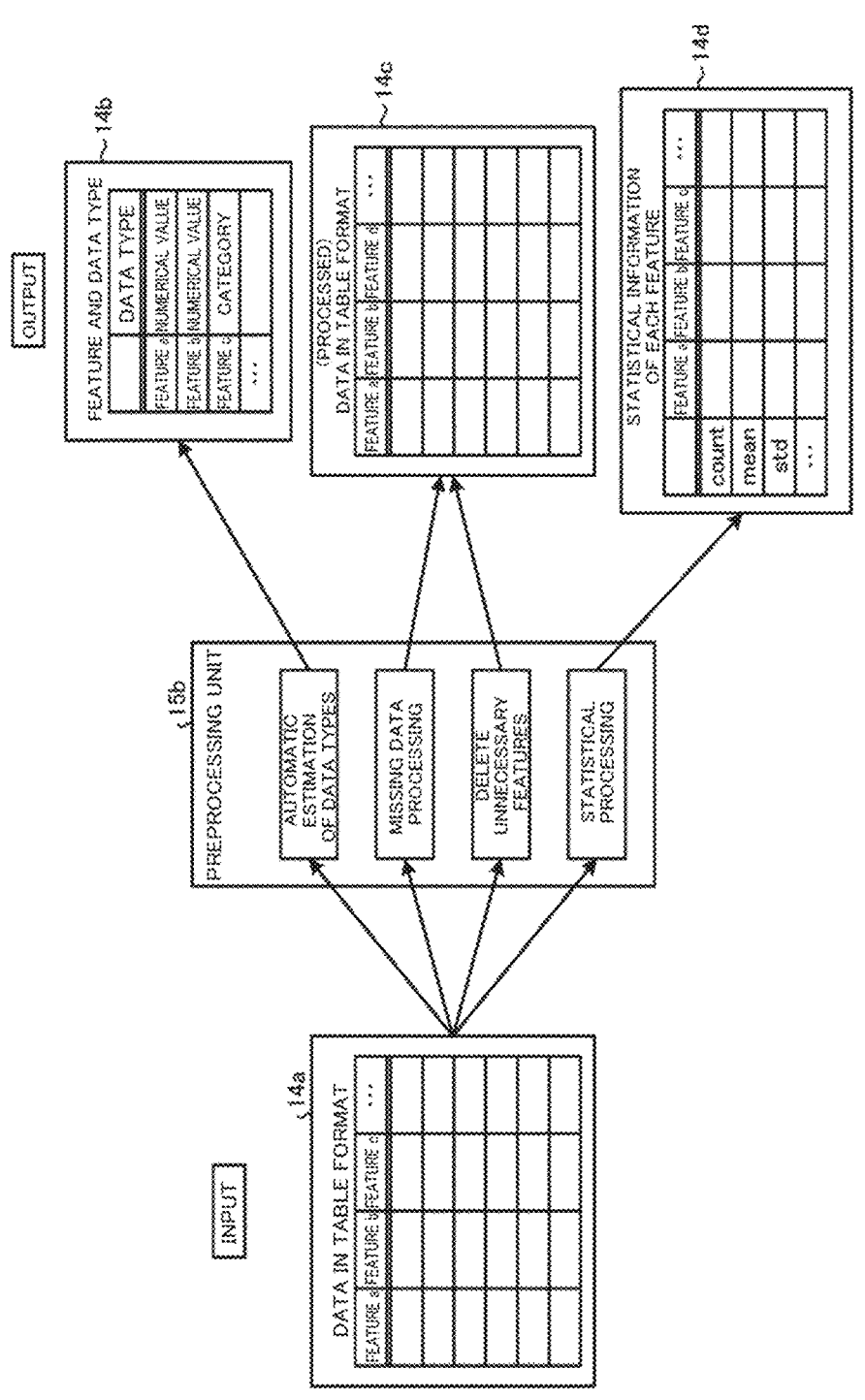
FIG. 2 is a diagram for explaining processing by a preprocessing unit.

Here, FIG. 2 is a diagram for illustrating processing by the preprocessing unit. As shown in FIG. 2, the preprocessing unit 15b receives data 14a from the acquisition unit 15a, performs various kinds of preprocessing, and outputs the results thereof. For example, the preprocessing unit 15b performs automatic estimation of data types using an OSS product in the market. Specifically, the preprocessing unit 15b extracts various features of data, estimates a data type of either a category or a numerical value for each feature, outputs a relationship 14b between the feature and the data type, and stores the feature and the data type in the storage unit 14.

The preprocessing unit 15b performs the missing data processing. Specifically, the preprocessing unit 15b calculates a complementary value to a missing value of a value of a feature of data, outputs data 14c in a table format in which each feature is set as a column and a sample as a row, and stores the data in the storage unit 14. For example, the preprocessing unit 15b complements the complementary value with respect to missing data if there is more than a predetermined percentage of missing data in each feature column or more than a predetermined percentage of missing values in each sample row. Here, when the data type is a numerical value, the preprocessing unit 15b determines the average value, the maximum value, or the minimum value of the corresponding feature, as a complementary value for a deleted missing value. When the data type is a category, the preprocessing unit 15b determines either "missing" or a mode value as the complementary value for a deleted missing value.

The preprocessing unit 15b deletes unnecessary features. Specifically, the preprocessing unit 15b deletes a feature not used for subsequent processing, among the data 14c in a table format representing the value of each feature. When all the values of the respective samples for the feature are identical, when the variance of the feature whose data type is a numeric value is a predetermined value or less, or when the type of the feature whose data type is a category a predetermined number or less, the preprocessing unit 15b deletes the relevant features.

The preprocessing unit 15b performs the statistical processing on features by using an Oss product in the market. For example, the preprocessing unit 15b calculates statistical information such as the total number, the average, and the standard deviation for each feature, outputs data 14d representing the statistical information of each feature, and stores the data in the storage unit 14.

Returning to the explanation of FIG. 1, the calculation unit 15c calculates a score representing a relationship between features of the input data. Specifically, the calculation unit 15c receives the data 14a acquired by the acquisition unit 15a via the preprocessing unit 15b, and calculates a weight of the relationship between the features as the score representing the relationship between the features of the data.

Figure 3:
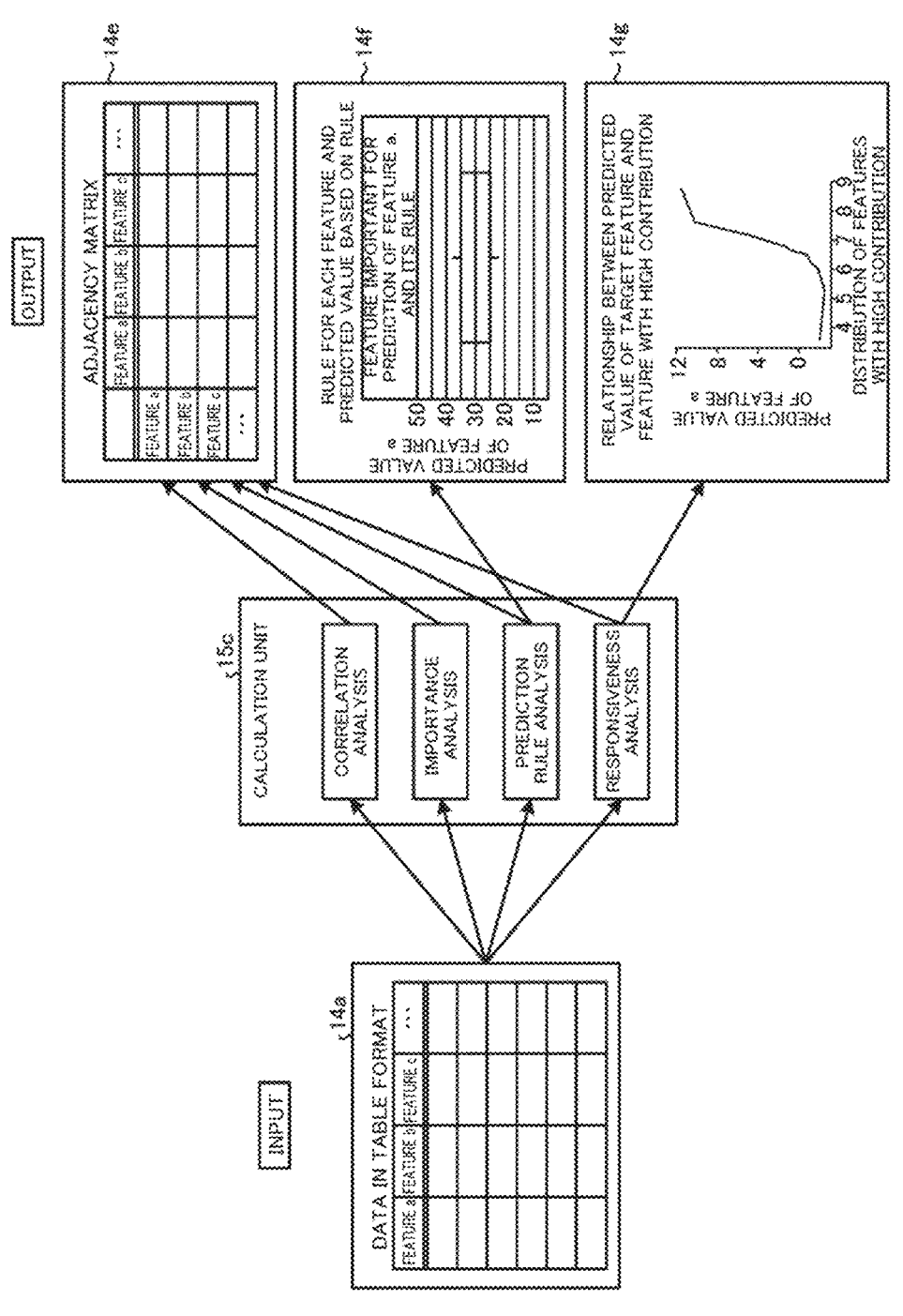
FIG. 3 is a diagram for explaining processing by a calculation unit.
Figure 4:
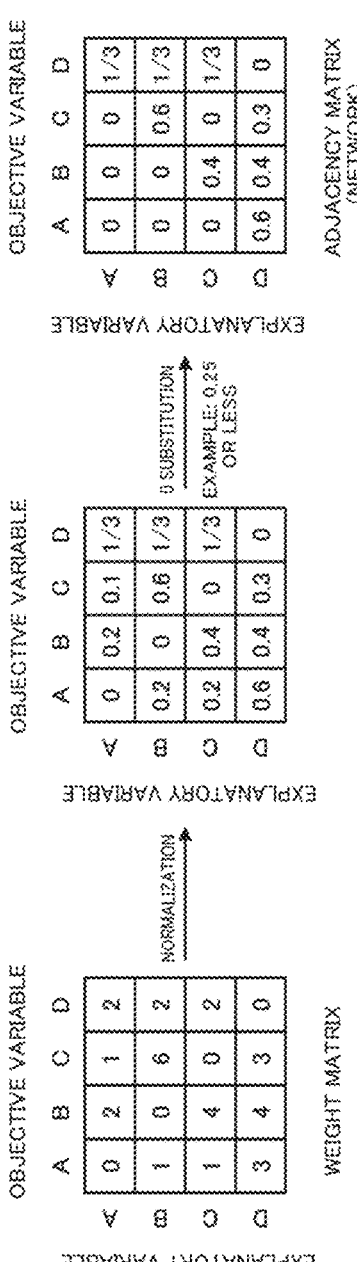
FIG. 4 is a diagram for explaining processing by the calculation unit.
Figure 5:
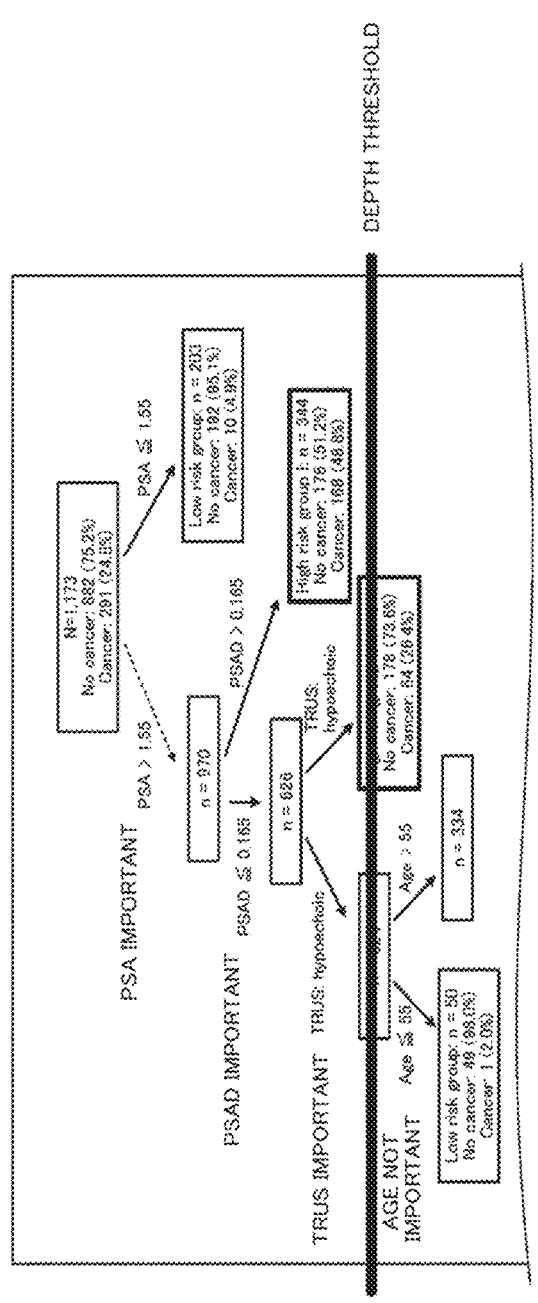
FIG. 5 is a diagram for explaining processing by the calculation unit.

Here, FIGS. 3 to 5 are each a diagram for explaining processing performed by the calculation unit 15c. Although the processing by the preprocessing unit 15b described above is omitted in the example shown in FIG. 3, results of the processing by the preprocessing unit 15b are inputted to the calculation unit 15c. However, the preprocessing unit 15b is not essential, and the data 14a acquired by the acquisition unit 15a may be input to the calculation unit 15c, as shown in FIG. 3.

Then, when a certain feature is defined as an objective variable and another feature is defined as an explanatory variable, the calculation unit 15c uses the contribution of the explanatory variable for predicting the objective variable, to calculate the weight of the relationship between the features. Specifically, as shown in FIG. 3, the calculation unit 15c calculates a weight of the relationship between the features by performing any of correlation processing, importance analysis, prediction rule analysis, and responsiveness analysis, and creates a weight matrix representing the weight of the relationship between the features. The calculation unit 15c creates an adjacency matrix 14e from the weight matrix and stores the adjacency matrix 14e in the storage unit 14.

Here, as shown in FIG. 4, an adjacency matrix 14 e is created from a weight matrix. First, the calculation unit 15c normalizes the weight of the weight matrix and aligns the value range of the weight of each feature. For example, the calculation unit 15c normalizes the weight by dividing it by the maximum value of the weight of the feature or the total value of the weights of the features. In the example shown in FIG. 4, the calculation unit 15c normalizes the weight of each column representing the weight of each explanatory variable with respect to a certain objective variable by dividing the weight of each column by the sum of the weights of the respective columns. For example, the weight of the column of an objective variable A is normalized by dividing the weight by the sum of the weights (1+1+3=5).

Then, the calculation unit 15c replaces the weight of a predetermined threshold or less with 0 to create the adjacency matrix 14e in order to leave a feature having high contribution to prediction. In the example shown in FIG. 4, the calculation unit 15*c* sets the threshold value to 0.25 and replaces, for example, the weight of an explanatory variable B with respect to the objective variable A, with 0.

Using the adjacency matrix 14*e* created here, a network graph can be created by setting a feature as a node and extending an edge between features whose weights are not 0. In this case, the edge has a direction from the explanatory variable of the adjacency matrix 14*e* to the objective variable.

Returning to the explanation of FIG. 3, the calculation unit 15*c* calculates the weight of the relationship between the features by, for example, correlation analysis. Specifically, the calculation unit 15*c* analyzes the correlation between the features, and calculates the correlation coefficient as the weight of the relationship between the features.

Alternatively, the calculation unit 15*c* calculates the weight of the relationship between the features by importance analysis. Specifically, the calculation unit 15*c* learns a machine learning model constructed by using each feature as an objective variable and using other features as explanatory variables among the features of the input data, and thereby calculates the weight of the relationship between the features.

For example, the calculation unit 15*c* learns by using an algorithm capable of calculating a contribution to the prediction of a feature, such as a decision tree and logistic regression, and uses the obtained contribution as the weight of the relationship between the features.

Alternatively, the calculation unit 15*c* calculates the weight of the relationship between the features by prediction rule analysis. Specifically, the calculation unit 15*c* calculates the weight of the relationship between the features by approximating the prediction result of the learned machine learning model by using a decision tree.

For example, as shown in FIG. 5, the calculation unit 15*c* approximates the prediction result of the machine learning model with a decision tree branched by a rule for each feature, and sets the weight by using the feature of the rule up to a predetermined depth of the decision tree as an important feature. For example, suppose that the weight of the important feature is 1 and that the weights of the other features are 0.

The decision tree shown in FIG. 5 is branched by features PSA, PSAD, TRSUS, and Age in this order, at a predetermined threshold obtained by learning a machine learning model with each feature as an objective variable. In this example, with a depth threshold value of the decision tree determined to be important as 3, a weight 1 is set for PSA, PSAD, and TRUS, and the weight of the Age of a depth 4 is set at 0.

In this case, as shown in FIG. 3, the calculation unit 15*c* may output a rule 14*f* for branching the decision tree, which represents a rule for each feature for specifying the decision tree and a predicted value based on the rule. In addition, the calculation unit 15*c* may store the output result in the storage unit 14. In the rule 14*f* for branching the decision tree shown in FIG. 3, a rule represented by using a feature important for predicting a certain feature a (for example, feature b>1.55 and feature c<0.165), and the range of predicted values for the feature a, are illustrated by way of example.

Alternatively, the calculation unit 15*c* calculates the weight of the relationship between the features by the responsiveness analysis. Specifically, the calculation unit 15*c* calculates, as the weight of the relationship between the features, the variation amount of the prediction result of the objective variable when the explanatory variable is independently changed, that is, the magnitude of deterioration in prediction accuracy. For example, if a certain explanatory variable is a continuous variable that can take the value range [0, 100], and the value range for predicted values calculated by continuously varying this explanatory variable is [−100, 100], then the calculation unit 15*c* uses a predicted value fluctuation amount 200 as the weight of the relationship between this explanatory variable and the objective variable.

The prediction accuracy of the responsiveness analysis is classification accuracy when the data type of the objective variable is a category type, and is regression accuracy when the data type is a numerical type. Since the classification accuracy and the regression accuracy are different in scale, the weight of the relationship between the features cannot be simply compared. Therefore, the weight of the relationship between the features can be compared by dividing each feature by the sum or maximum value of the weight of each feature and normalizing it.

In this case, as shown in FIG. 3, the calculation unit 15*c* may output a distribution chart 14*g* that represents the relationship between the predicted value of the feature that is the objective variable of the machine learning model and the feature that is the explanatory variable with high contribution to the prediction of this feature. In addition, the calculation unit 15*c* may store the output result in the storage unit 14. In the distribution chart 14*g* shown in FIG. 3, the predicted value of the feature a and a distribution of the feature having high contribution to the prediction of the feature a are illustrated.

Returning to the explanation of FIG. 1, the analysis unit 15*d* analyzes the importance of each feature according to the score representing the relationship between the features of the input data. Specifically, the analysis unit 15*d* analyzes the importance of each feature by analyzing the centrality, in a network graph, of the features created by using scores representing the relationships among features. The analysis unit 15*d* may present the importance of each analyzed feature.

Figure 6:
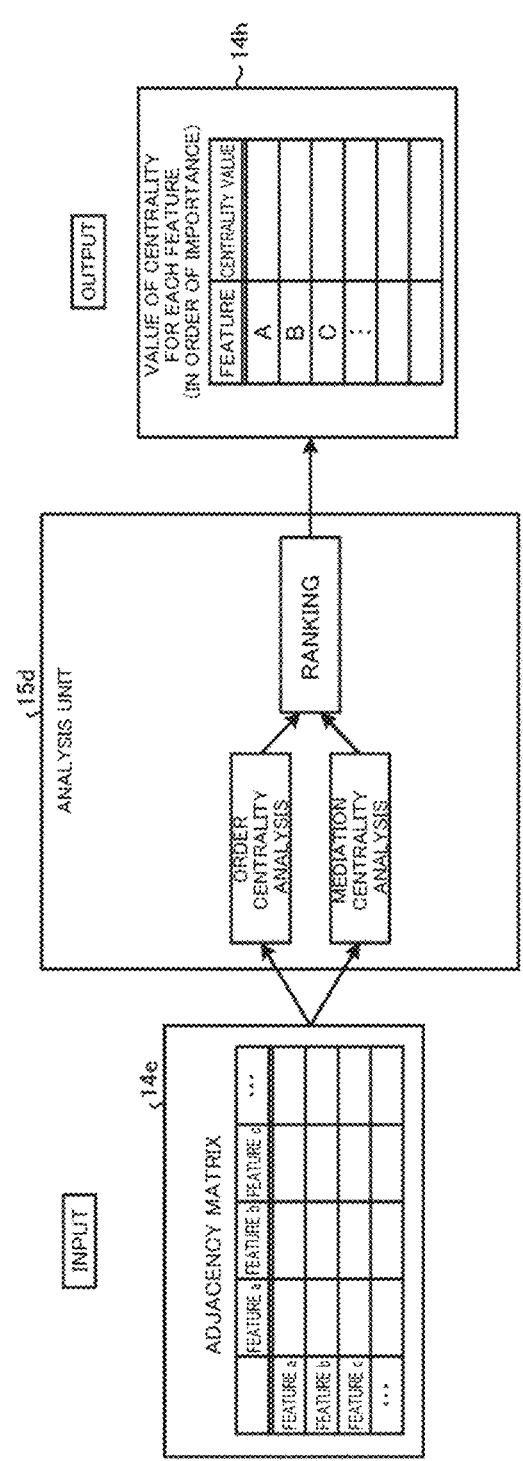
FIG. 6 is a diagram for explaining processing of an analysis unit.

Here, FIG. 6 is a diagram for explaining processing by the analysis unit. As shown in FIG. 6, the analysis unit 15*d* creates a network graph by using the adjacency matrix 14*e* acquired from the calculation unit 15*c*, and performs graph mining such as order centrality analysis or mediation centrality analysis. Thus, the feature having a large weight, which is dependent on more features, is considered an important feature.

Specifically, the analysis unit 15*d* creates a network graph by using a feature as a node and by extending an edge between features whose weight are not 0. In this case, the edge has a direction from the explanatory variable of the adjacency matrix 14*e* to the objective variable. Then, the analysis unit 15*d* analyzes the centrality of either the order centrality or the mediation centrality of the graph by using an OSS product in the market.

For example, in the order centrality analysis, the analysis unit 15*d* determines the order, that is, the feature having a large number of edges between features, as important. In this case, as described above, when the calculation unit 15*c* creates the adjacency matrix 14*e*, the analysis unit 15*d* determines the feature with non-zero weight and an edge to be important, by replacing the weight equal to or lower than a predetermined threshold with 0.

Alternatively, in the mediation centrality analysis, the analysis unit 15*d* determines, as important, a feature having a high degree of being on the shortest path from a certain feature to another feature, that is, a feature having a high degree of acting as a hub in the network graph to mediate the paths to other features. In this case, when the edge connected to the feature of high importance is disconnected, the network is disconnected.

Further, the analysis unit 15d may use the centrality values of the features determined to be important, aggregate them in order of importance, and output a ranking 14h.

In addition, the analysis unit 15d may store the output result in the storage unit 14. In the ranking 14h illustrated in FIG. 6, the features and the centrality values are associated with each other in order of importance of the features.

Returning to the explanation of FIG. 1, the extraction unit 15e extracts a combination of the analysis unit and features whose scores satisfy a predetermined condition. The specification unit 15f specifies a visualization method for each extracted combination. Specifically, in accordance with at least the types and connection relationships of the features constituting the extracted combination, the specification unit 15f specifies the visualization system for the combination.

Figure 7:
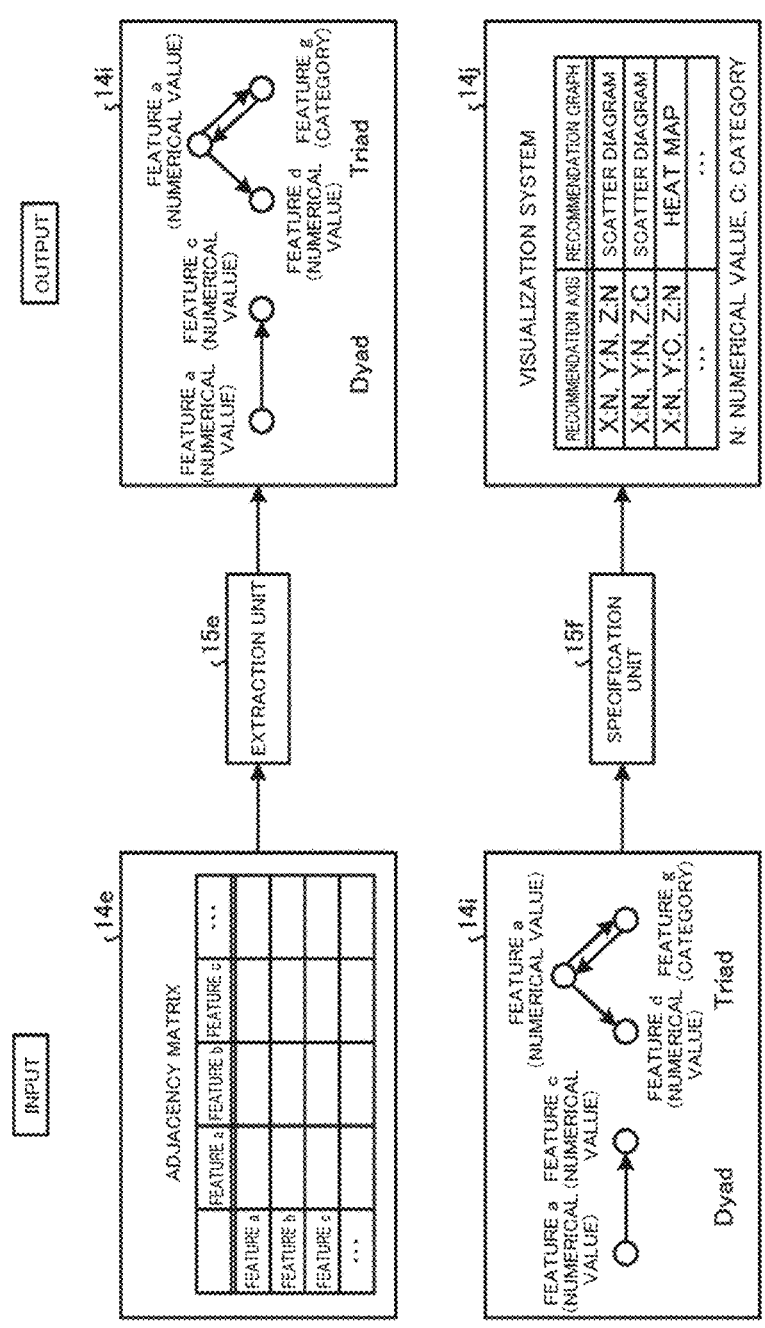
FIG. 7 is a diagram for explaining processing by an extraction unit and a specification unit.

Here, FIG. 7 is a diagram for explaining processing by the extraction unit and the specification unit. As shown in FIG. 7, the extraction unit 15e extracts and outputs all combinations 14i of two (Dyad) or three (Triad) features whose weights are not zero and that have an edge, from the adjacency matrix 14e input from the calculation unit 15c. In so doing, the extraction unit 15e specifies the data type of each feature and the connection relationship between the features, that is, the direction of the edge. In the example shown in FIG. 7, for example, a combination (Dyad) of the feature a whose data type is numerical value and the feature c whose data type is a numerical value is extracted, in which the direction of the edge is one direction from the feature a to the feature c.

Also, the specification unit 15f specifies a recommendable visualization system 14j for the extracted combinations 14i in accordance with, for example, the number of features (2 or 3) of each combination, the data type, the direction of the edge, and the like. In addition, the acquisition unit 15f may store the output result in the storage unit 14. Here, the visualization system includes, for example, a graph type such as a scatter diagram or a heat map, and a feature corresponding to each axis of the graph at the time of drawing. The feature corresponding to each axis may be designated by a user in processing of the drawing unit 15g described hereinafter.

The association between the conditions such as the number of features of the combination, the data type, the direction of the edge, and the visualization system may follow a preset rule. Alternatively, the association between the conditions and the visualization system may be set by learning using the visualization result of the combination of the past features as correct data and the graph type as an objective variable.

Here, when the number of features of the combination is 2, the condition of the data type is any of numerical value x numerical value, numerical value x category, and category x category. The condition of the direction of the edge (connection relationship between features) is either unidirectional such as feature A→feature B or feature A←feature B, or bidirectional feature A⇔feature B.

Similarly, when the number of features of the combination is 3, the condition of the data type is numerical value x numerical value x numerical value, numerical value x numerical value x category, or the like. The condition of the direction of the edge is feature A→feature B→feature C, feature A→feature B←feature C, or the like.

The association between these conditions and the graph type is set as a scatter diagram when x: numerical value and y: numerical value, a violin plot when x: numerical value and y: category, a violin plot when x: category and y: numerical value, and a heat map when x: category and y: category. The association between the conditions and the axis of the graph is set such that, for example, x-axis: A and y-axis: B in the case of A→B, x-axis: B and y-axis: A in the case of A←B, X-axis: A and y-axis: B and x-axis: B and y-axis: A in the case of A⇔B, and the like.

Then, the specification unit 15f specifies a recommendable visualization system such as "scatter diagram, x-axis: feature A, y-axis: feature B" and the like corresponding to "feature A: numerical value, feature B: numerical value, connection relationship between features: feature A→feature B."

In the example shown in FIG. 7, as the recommender visualization system 14j, for example, "a scatter diagram with feature of X-axis: numerical value, feature of Y-axis: numerical value, feature of Z-axis: numerical value" is output.

Returning to the explanation of FIG. 1, Using a combination of features and the visualization system corresponding to said combination, the drawing unit 15g draws the relationship between the features constituting said combination, in order of priority according to the importance.

Figure 8:
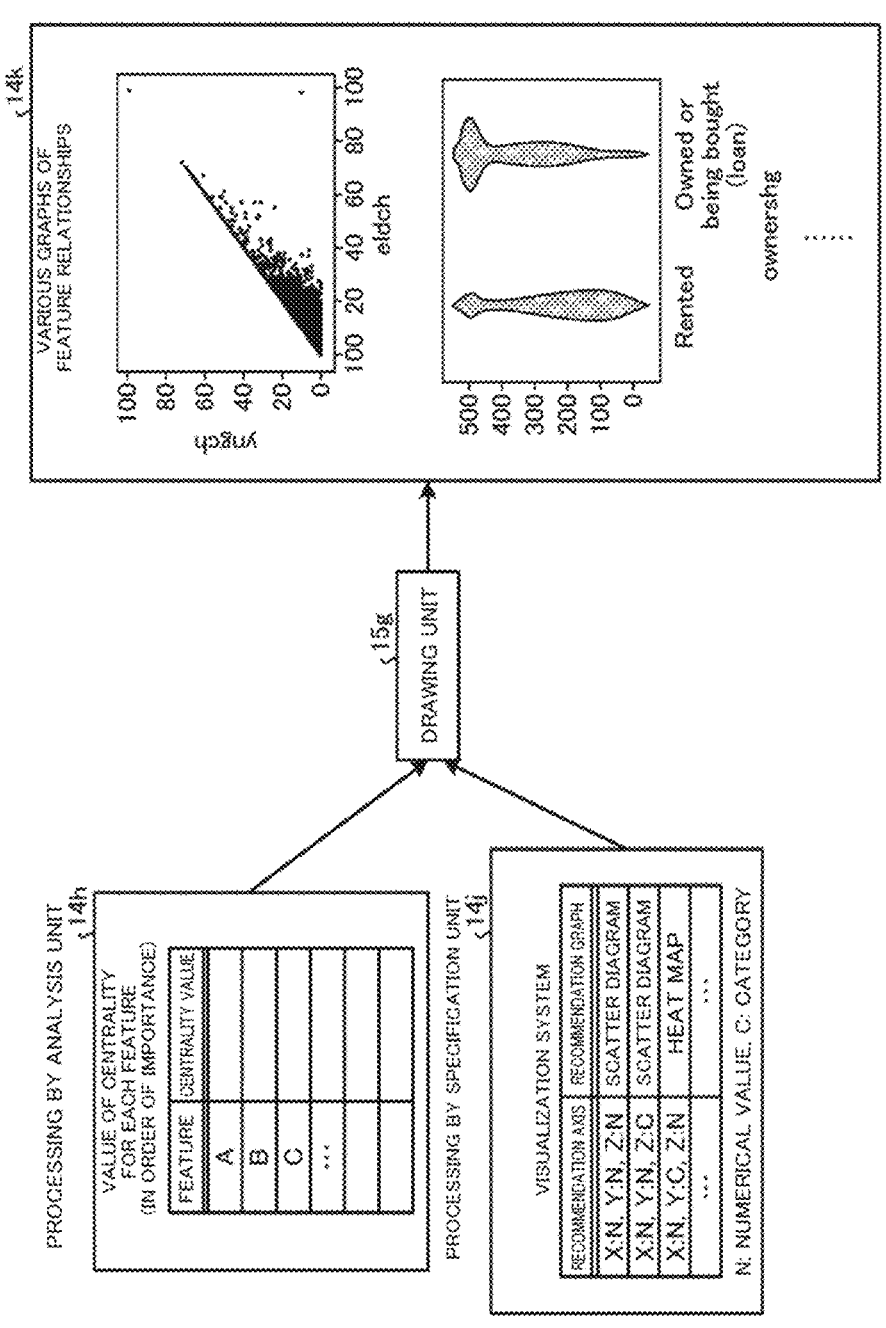
FIG. 8 is a diagram for explaining processing by a drawing unit.

Here, FIG. 8 is a diagram for explaining processing by the drawing unit. As shown in FIG. 8, the drawing unit 15g selects a combination of features with high importance, by using the ranking 14h of importance of the features output by the analysis unit 15d and the visualization system 14j output by the specification unit 15f. Then, the drawing unit 15g draws a relationship 14k between the features based on the visualization system corresponding to the selected combination and outputs the relationship 14k to the output unit 12. Consequently, the relationship 14k between features in a format appropriate for each combination of features, such as a scatter diagram, a violin plot, or a heat map, is output.

The combination of features to be drawn is not limited to the case where the drawing unit 15g automatically selects the combination; for example, the user may select it by referring to the ranking 14h of the importance of features that is presented by the analysis unit 15d. Further, a plurality of features to be drawn or a part of the combination may be selected by the user. When a part of the combination is selected by the user, the drawing unit 15g selects a combination of features including the selected features. When there exist a plurality of combinations including the selected features, the drawing unit 15g may draw the relationship 14k between features in, for example, descending order of weight of the adjacency matrix 14e.

In addition to the ranking 14h, the visualization device 10 may output, to the output unit 12, information output from each of the functional units described above, such as the network graph, a rule diagram such as the rule 14f for branching the decision tree, and the distribution chart 14g of the features having high contribution to the prediction of features. Thus, useful features of the data can be easily grasped.

[Visualization Processing]

Figure 9:
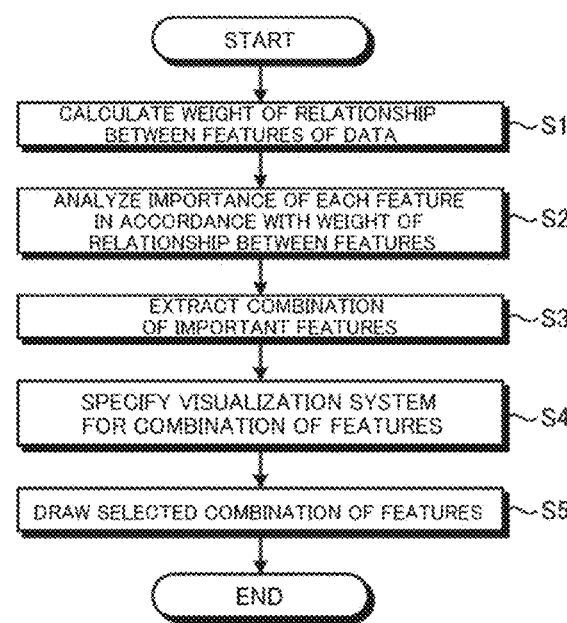
FIG. 9 is a flowchart showing a visualization processing procedure.

Next, visualization processing by the visualization device 10 according to the present embodiment will be described with reference to FIG. 9. FIG. 9 is a flowchart showing a visualization processing procedure. The flow chart of FIG. 9 is started at the timing at which, for example, the user inputs an operation of instructing the start.

First, the calculation unit 15*c* calculates the weight of the relationship between features as a score representing the relationship between features of the input data (step S1). Next, the analysis unit 15*d* analyzes the importance of each feature according to the weight of the relationship between features of the input data (step S2). For example, the analysis unit 15*d* creates a weight matrix by using the weight of the relationship between features, analyzes the importance of each feature by analyzing the centrality of the features in the network graph that are created from the weight matrix, and output the ranking 14*h* of the importance.

Next, the extraction unit 15*e* extracts a combination of important features whose scores satisfy a predetermined condition (step S3). For example, a combination of two or three features whose scores are not 0 is extracted in the adjacency matrix 14*e*.

Also, in accordance with at least the types and connection relationships of features constituting the extracted combination, the specification unit 15*f* specifies the visualization system 14*j* for said combination (step S4). In this case, the conditions such as the data types and connection relationships of the features may be associated with the visualization system by setting a rule in advance, and the learning may be performed using the visualization result for the combination of the past features as correct answer data and the graph type as an objective variable.

Then, the drawing unit 15*g* or the user selects a feature to be drawn on the basis of the ranking 14*h* of importance. Using a combination of features including the selected feature and the visualization system corresponding to said combination, the drawing unit 15*g* draws the relationship 14*k* between the features constituting said combination (step S5). In this manner, a series of visualization processing is ended.

As described above, in the visualization device 10 of the present embodiment, the analysis unit 15*d* analyzes the importance of each feature in accordance with the score representing the relationship between features of the input data. The extraction unit 15*e* extracts a combination of features whose scores satisfy a predetermined condition. Also, in accordance with at least the types and connection relationships of features constituting the extracted combination, the specification unit 15*f* specifies the visualization system 14*j* for said combination. Using the combination of features and the visualization system corresponding to said combination, the drawing unit 15*g* draws the relationship 14*k* between the features constituting said combination, in order of priority according to the importance. Accordingly, since the combination of important features and the visualization system for the combination are recommended, the useful features of the data can be easily visualized.

The calculation unit 15*c* also constructs a machine learning model constructed by using each feature as an objective variable and using the other features as explanatory variables among the features of the input data, and thereby calculates a score representing the relationship between the features. For example, the calculation unit 15*c* approximates the prediction result of the learned machine learning model by using a decision tree, to calculate a score representing the relationship between the features. In this manner, useful features of the data can be specified with high accuracy.

The analysis unit 15*d* analyzes the importance of each feature by analyzing the centrality of the feature in the network graph that is created by using a score representing the relationship between the features. In this manner, useful features of the data can be specified with high accuracy.

In the visualization device 10, the analysis unit 15*d* analyzes the importance of each feature according to the score representing the relationship between the features of the input data, associates each feature with the importance of the each feature, and presents a ranking in the descending order of the importance. Also, the drawing unit 15*g* acquires the feature selected by the user on the basis of the presented result, and by a combination of the features including said feature and the predetermined visualization system 14*j* corresponding to the specified combination, draws the relationship 14*k* between features constituting said combination.

Therefore, for example, since a feature with high importance is presented to the user, the feature is selected as a feature to which the user should pay attention, and, with respect to the selected feature, the relationship is drawn based on a visualization system recommended for each combination of the features. In this manner, the relationship between high features is easily and appropriately visualized, and the useful features of the data are easily visualized.
[Program]

It is also possible to create a program that describes the processing executed by the visualization device 10 according to the foregoing embodiments in a language that can be executed by a computer. As one embodiment, the visualization device 10 can be implemented by installing a visualization program which executes the above-described visualization processing in a desired computer as package software or online software. For example, an information processing apparatus can be caused to function as the visualization device 10 by causing the information processing apparatus to execute the visualization program described above. The information processing apparatus described here includes a desktop or laptop personal computer. In addition, the scope of the information processing apparatus also includes mobile communication terminals such as a smartphone, a mobile phone, and a PHS (Personal Handyphone System), and slate terminals such as a PDA (Personal Digital Assistant), for example. In addition, the function of the visualization device 10 may also be provided in a cloud server.

Figure 10:
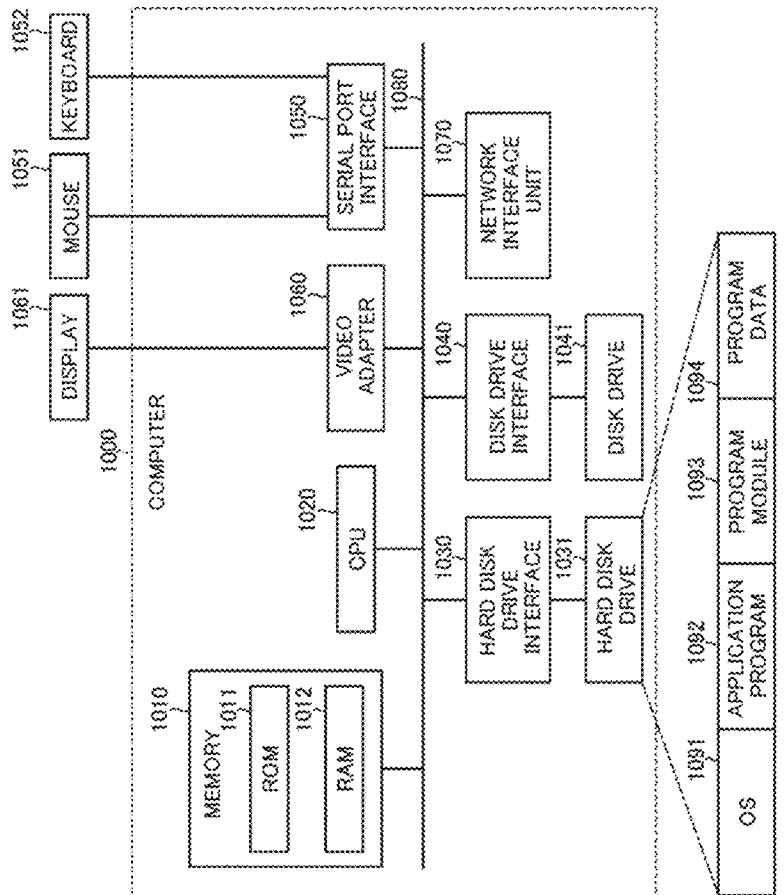
FIG. 10 is a diagram showing an example of a computer that executes a visualization program.

FIG. 10 is a diagram showing an example of a computer that executes the visualization program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1031. The disc drive interface 1040 is connected to a disc drive 1041. A detachable storage medium such as a magnetic disk or an optical disc, for example, is inserted into the disc drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. Each of the pieces of information described in the above embodiments is stored in, for example, the hard disk drive 1031 or the memory 1010.

In addition, the visualization program is stored in the hard disk drive 1031 as the program module 1093 in which, for example, a command executed by the computer 1000 is described. Specifically, the program module 1093 in which each processing executed by the visualization device 10 explaining in the above embodiments is described is stored in the hard disk drive 1031.

In addition, data used in information processing by the visualization program are stored in, for example, the hard disk drive 1031 as the program data 1094. The CPU 1020 reads the program module 1093 and the program data 1094 stored in the hard disk drive 1031 into the RAM 1012 on an as-needed basis, and executes each procedure described above.

Note that the storage of the program module 1093 and the program data 1094 related to the visualization program is not limited to the case where the program module 1093 and the program data 1094 are stored in the hard disk drive 1031, and the program module 1093 and the program data 1094 may be stored in, for example, a detachable storage medium and may be read by the CPU 1020 via the disk drive 1041. Alternatively, the program module 1093 and the program data 1094 related to the visualization program may be stored in another computer connected via a network such as LAN or WAN (Wide Area Network), and read out by the CPU 1020 via the network interface 1070.

Although the embodiments to which the invention made by the present inventor has been applied have been described above, the present invention is not limited by the description and the drawings that form a part of the disclosure of the present invention according to the present embodiments. That is, other embodiments, examples, operational techniques, and the like made by those skilled in the art or the like on the basis of the present embodiments are all included in the category of the present invention.

REFERENCE SIGNS LIST

10 Visualization device
11 Input unit
12 Output unit
13 Communication control unit
14 Storage unit
15 Control unit
15a Acquisition unit
15b Preprocessing unit
15c Calculation unit
15d Analysis unit
15e Extraction unit
15f Specification unit
15g Drawing unit

The invention claimed is:

1. A visualization device, comprising:
a memory; and
a processor coupled to the memory and programmed to perform operations comprising:
obtaining input data;
extracting a plurality of features from the input data;
identifying pairs of features from the plurality of features;
calculating weights respectively corresponding to the pairs of features based on at least one of a correlation analysis, an importance analysis, a prediction rule analysis, or a responsiveness analysis, wherein the respective weight indicates a strength of a relationship between the corresponding pair of features;
generating, using the calculated weights, an adjacency matrix of the pairs of features;
calculating centrality values of the plurality of features based on a centrality analysis of the adjacency matrix of the pairs of features;

extracting a combination of features from the plurality of features based on the centrality values of the plurality of features;
identifying a visualization system for the extracted combination of features in accordance with at least types and connection relationships of features included in the extracted combination of features; and
drawing a relationship between the features included in the extracted combination of features in order of priority according to the calculated centrality values, based on the extracted combination of features and the visualization system corresponding to the extracted combination of features.

2. The visualization device according to claim 1, wherein calculating the weights respectively corresponding to the pairs of features comprises training a machine learning model in which one of the plurality of features is constructed as an objective variable and at least one other feature of the plurality of features is constructed as an explanatory variable.

3. The visualization device according to claim 2, wherein training the machine learning model comprises approximating a prediction result of the trained machine learning model using a decision tree.

4. A visualization device, comprising:
a memory; and
a processor coupled to the memory and programmed to perform operations comprising:
presenting centrality values of a plurality of features, wherein:
the centrality values of the plurality of features are calculated based on a centrality analysis of an adjacency matrix of pairs of features;
the pairs of features are identified from the plurality of features;
the adjacency matrix is generated using weights respectively corresponding to the pairs of features; and
the weights are calculated based on at least one of a correlation analysis, an importance analysis, a prediction rule analysis, or a responsiveness analysis, wherein the respective weights indicate a strength of a relationship between the corresponding pair of features;
obtaining a feature selected by a user based on the presented centrality values of the plurality of features; and
drawing a relationship between features including the combination of features including the selected feature, based on the combination of features including the selected feature and a predetermined visualization system corresponding to the combination of features including the selected feature.

5. A visualization method executed by a visualization device, comprising:
obtaining input data;
extracting a plurality of features from the input data;
identifying pairs of features from the plurality of features;
calculating weights respectively corresponding to the pairs of features based on at least one of a correlation analysis, an importance analysis, a prediction rule analysis, or a responsiveness analysis, wherein the respective weight indicates a strength of a relationship between the corresponding pair of features;
generating, using the calculated weights, an adjacency matrix of the pairs of features;

calculating centrality values of the plurality of features based on a centrality analysis of the adjacency matrix of the pairs of features;

extracting a combination of features from the plurality of features based on the centrality values of the plurality of features;

identifying a visualization system for the extracted combination of features in accordance with at least types and connection relationships of features included in the extracted combination of features; and drawing a relationship between the features included in the extracted combination of features in order of priority according to the calculated centrality values, based on the extracted combination of features and the visualization system corresponding to the extracted combination of features.

6. The visualization method according to claim 5, wherein calculating the weights respectively corresponding to the pairs of features comprises training a machine learning model in which one of the plurality of features is constructed as an objective variable and at least one other feature of the plurality of features is constructed as an explanatory variable.

7. The visualization method according to claim 6, wherein training the machine learning model comprises approximating a prediction result of the trained machine learning model using a decision tree.

8. A non-transitory computer-readable recording medium having stored a visualization program that, when executed by a processor, causes the processor to perform operations, comprising:

obtaining input data;

extracting a plurality of features from the input data;

identifying pairs of features from the plurality of features;

calculating weights respectively corresponding to the pairs of features based on at least one of a correlation analysis, an importance analysis, a prediction rule analysis, or a responsiveness analysis, wherein the respective weight indicates a strength of a relationship between the corresponding pair of features;

generating, using the calculated weights, an adjacency matrix of the pairs of features;

calculating centrality values of the plurality of feature based on a centrality analysis of the adjacency matrix of the pairs of features;

extracting a combination of features from the plurality of features based on the centrality values of the plurality of features;

identifying a visualization system for the extracted combination of features in accordance with at least types and connection relationships of features included in the extracted combination of features; and a drawing step of drawing a relationship between the features included in the extracted combination of features in order of priority according to the calculated centrality values, based on the extracted combination of features and the visualization system corresponding to the extracted combination of features.

9. The non-transitory computer-readable medium according to claim 8, wherein calculating the weights respectively corresponding to the pairs of features comprises training a machine learning model in which one of the plurality of features is constructed as an objective variable and at least one other feature of the plurality of features is constructed as an explanatory variable.

10. The non-transitory computer-readable medium according to claim 9, wherein training the machine learning model comprises approximating a prediction result of the trained machine learning model using a decision tree.

* * * * *